Patented Feb. 7, 1950

2,496,864

UNITED STATES PATENT OFFICE 2,496,864

EMULSION POLYMERIZATION OF STYRENE

Edmond F. Fiedler, Adams, and Glennard R. Lucas, Pittsfield, Mass., assignors to General Electric Company, a corporation of New York No Drawing. Application April 24, 1948, Serial No. 23,128

12 Claims. (Cl. 260—93.5)

This invention is concerned with a method for making polystyrene. More particularly, the invention relates to a method for preparing a crystal-clear polystyrene free of discoloration and having a heat distortion value of at least 90° C., which method comprises heating an emulsified mass comprising (1) styrene, (2) water, (3) a fatty acid component selected from the class consisting of (a) myristic acid, (b) palmitic acid, (c) stearic acid, and (d) mixtures of long chain fatty acids comprising saturated aliphatic monocarboxylic acids having an even number of carbon atoms and containing from 12 to 18 carbon atoms (e. g., lauric acid, myristic acid, palmitic acid, and stearic acid) whose average molecular weight is equal to from at least 210 to below 284, (4) an alkali-metal hydroxide sufficient to neutralize at least 90 per cent of the acids of (3), and (5) a polymerization catalyst comprising 1-hydroxycyclohexyl hydroperoxide-1.

One of the objects of this invention is to prepare an acceptable polystyrene by emulsion polymerization which is equal to or better in many respects to polystyrene prepared by casting.

Another object of the invention is to prepare by emulsion polymerization a polystyrene free of objectionable color.

A further object of the invention is to prepare a polystyrene having improved mechanical and heat distortion properties.

A still further object of the invention is to prepare polystyrene in relatively short periods of time, and in good yields, and whose properties can be reproduced easily.

Additional objects of this invention will become more apparent as the discussion thereof proceeds.

The most important present day technique for manufacturing polystyrene from monomeric styrene having good clarity and substantially free of discoloration involves casting the monomer in bulk in the presence of a suitable catalyst while at the same time heating the mass. This procedure has heretofore been found essential in order to obtain a polystyrene which is substantially free of color, which is crystal-clear and water white, and which has a sufficiently high molecular weight so as to give satisfactory mechanical strength and heat distortion values. Although attempts have been made to prepare such polystyrene by other methods, for instance, by means of emulsion polymerization, nevertheless, the results have heretofore been unsuccessful because of the formation of a yellow coloring in the polystyrene as a result of the emulsion polymerization; to diminish the coloring of the polystyrene would require expensive and complicated procedures which would make such production techniques uneconomical.

We have now discovered that we are able to prepare polystyrene from monomeric styrene by an emulsion polymerization operation to give a product which is water-white and crystal-clear, and which has improved strength characteristics and heat distortion values over those heretofore obtainable by means of the casting techniques employed for the same purpose. We have found that, in contrast to heat distortion values of 70° to 80° C. resulting from the use of casting methods, we are able to obtain by our claimed process heat distortion values of at least 90° C., and in many cases over 100° C. without any sacrifice in the color of the polymeric material. In addition, the mechanical strengths of the polystyrene produced in accordance with our invention are substantially higher than has heretofore been possible by using other methods of making the polystyrene.

One of the results flowing from our invention is that the polystyrene can be prepared in the matter of only a few hours without impairing any of its desirable qualities such as color, physical properties, etc. In addition, the temperatures employed in our process are relatively low, thus making our process economically attractive, especially since no rigid temperature or other controls are necessary. These results are to be contrasted with casting techniques which require many hours of heating under rigidly controlled temperature conditions.

In accordance with our invention, the desirable results described above are effected by employing a particular combination of ingredients within specific ranges. One of the important features of our invention resides in the fact that we employ certain specific long-chain fatty acids to effect emulsification in amounts heretofore believed too small to give the desired results. Unexpectedly, we found that by employing these particular acids in low concentrations, we were able to obtain a crystal-clear, water-white polystyrene free of discoloration, while at the same time effecting a satisfactory emulsification of the polymerization system, without necessitating the removal of the long-chain fatty acid or its salt. In addition, it was found that the polystyrene thus prepared had heat distortion values and mechanical strength superior to those obtained by casting methods. In addition to the requirement for the use of a particular fatty acid for emulsification, it was found that the desirable results described above could only be obtained by the use of a specific polymerization catalyst, namely, 1-hydroxycyclohexyl hydroperoxide-1.

These requirements for successful attainment of the desired results were entirely unexpected and in no way could have been predicted from attempts to use individual long-chain fatty acids other than the aforementioned acids, and other commonly used emulsion vinyl polymerization catalysts. Thus, for example, the use of lauric acid in an amount less than 1 per cent did not result in any emulsification. Amounts in excess of 1 per cent, e. g., 2 to 3 per cent sufficient to give satisfactory emulsification, yielded products possessing inferior color and strengths unless the acid or its salt was removed by expensive and complex procedures after the polymerization operation and before molding. The use of a fatty acid such as oleic acid which is commonly employed in emulsion polymerization reactions also causes undesirable coloring of the polystyrene.

In contrast to the above, the use of myristic, palmitic and stearic acids, and mixtures of saturated aliphatic monocarboxylic acids containing from 12 to 18 carbon atoms having an average molecular weight of from 210 to 284, preferably, from 220 to 260, in amounts equal to at most 1 per cent resulted in clear, water-white products which had improved color and physical properties and which did not require the removal of the acid or its salts from the formed polystyrene. The presence in the polystyrene of the fatty acid had the additional effect of acting as a parting agent on molding.

Furthermore, it was found that the use of other emulsion polymerization catalysts in place of 1-hydroxycyclohexyl hydroperoxide-1 either failed to effect any polymerization in our emulsification system (hydrogen peroxide) or gave a dark, yellowish brown color (potassium persulfate), or caused excessive agglomeration and the formation of too low molecular weight polymers (tertiary-butyl hydroperoxide).

The myristic, palmitic, stearic or mixture of long-chain fatty acids is generally present in an amount equal to 1 per cent or less, e. g., from 0.3 per cent to 1 per cent, preferably from 0.4 to 0.8 per cent, by weight, based on the weight of the styrene.

Although the amount of 1-hydroxycyclohexyl hydroperoxide-1 may be varied within broad ranges, nevertheless, we have found that optimum results are obtained when this polymerization catalyst is present in an amount equal to from 0.1 to 2 per cent, preferably from 0.25 to 1 per cent, by weight, based on the weight of the monomeric styrene. We have also discovered that certain unexpected advantages are obtained by adding the catalyst incrementally. Thus, we have found it advantageous to add from 15 to 25 per cent of the catalyst at the start of the emulsion polymerization, thereafter adding from 35 to 50 per cent of the catalyst after about one hour, and the remainder of the catalyst after about 2 hours. By means of this progressive addition of the catalyst, it has been found possible to increase the rate of polymerization and improve the yield considerably without impairing the properties of the polystyrene in any way.

In the practice of our invention, we have found that the introduction of as little as 0.25 part, e. g., from 0.25 to 3 parts, of a water-soluble copper or silver salt per million parts of water gave a satisfactory polymerization rate and essentially a complete conversion of the styrene to polystyrene. In addition, such introduction of the metal salts aided in controlling the molecular weight of the polystyrene. Thus, we may use such water-soluble salts as, for example, copper sulfate ($CuSO_4 \cdot 5H_2O$), silver nitrate, copper nitrate [for example, $Cu(NO_3)_2 \cdot 3H_2O$], etc. The term "water-soluble" when employed in connection with the foregoing inorganic copper and silver salts is intended to mean those salts which have good solubility in water, for example, are soluble in the ratio of at least 25 parts of the salt per 100 parts of water, when measured at around 25° C.

We have also found that the ratio of monomeric styrene to water (preferably distilled or deionized) in the emulsified system plays an important part in determining the rate of polymerization, the yield and type of product obtained, as well as ease of preparation of the polymer. Thus, on a weight basis we have found that for each part of monomeric styrene we may advantageously employ from 1.5 to 2.8 parts water per part styrene. Amounts of water in excess of the above ratio resulted in low yields of the polymer and the use of smaller amounts of water resulted in undesirable increases in viscosity with attendant stirring difficulties as well as the inability to control adequately the temperature of the reaction mixture.

In determining the average molecular weight of mixtures of the aforementioned saturated aliphatic monocarboxylic acids, due consideration must be given both to the respective molecular weight and the amount (or weight) of the individual acids comprising the mixture of the long chain fatty acids as compared to the ratio of the total amount (or weight) of the mixture of acids and the average molecular weight to be determined. More specifically, a formula covering this type of calculation is as follows:

$$\frac{\text{Weight of acid A}}{\text{Mol. wt. of acid A}} + \frac{\text{weight of acid B}}{\text{mol. wt. of acid B}} = \frac{\text{total wt. of A and B}}{\text{average mol. wt. to be determined}}$$

Among the alkali-metal hydroxides (which form soaps with the long-chain fatty acids which in turn act as the emulsifying agents for the styrene) which may be employed in effecting neutralization of the long-chain fatty acid or mixture of fatty acids may be mentioned, for instance, sodium hydroxide, potassium hydroxide, lithium hydroxide, etc. We prefer to use potassium hydroxide, since there is a minimum of agglomeration with the use of this particular alkali-metal hydroxide.

The amount of alkali-metal hydroxide is preferably in an amount equal to from 85 to 125 per cent of that required to neutralize the fatty acid or acids. Amounts below 85 per cent do not give satisfactory emulsions and amounts in excess of 125 per cent do not produce any beneficial effects merely making the emulson more alkaline. We have found that best results are obtained when neutralization is from 95 to 105 per cent complete or, for the upper limit, a 5 per cent molar excess of the alkali-metal hydroxide over that required for complete neutralization is preferred.

In effecting the emulsion polymerization, it is desirable that certain precautions as to temperature limitations be taken. Thus the use of a high temperature will cause undesirable discoloration and appreciably lower heat distortion values. In addition, the viscosity of the latex increases with the use of higher temperatures. We advantageously employ temperatures ranging from 50° to 90° C., preferably from 60 to 75° C., to retain better control of the reaction and to obtain a more uniform product. The time required for complete polymerization will of course depend on many factors, e. g., temperature, catalyst concentration, presence or absence of water-soluble copper or silver inorganic salts, etc. Generally, under optimum conditions of reaction, we may employ from two to six hours for completion of the emulsion polymerization reaction. We have found however, that the use of longer times of reaction may result in polymers having improved properties over polymers prepared in accordance with our claimed process which have been emulsion polymerized for shorter periods of time.

Thus, by conducting the emulsion polymerization at about 60°-64° C. for approximately 21 hours, we have obtained transfer molded polystyrene having heat distortion temperatures of the order of 105° C., a flexural strength of about 14,400 p. s. i., and an impact strength of approximately 0.12 to 0.17 ft. lb. However, the practical reasons, it is usually desirable to conduct the emulsion polymerization for the least possible time consistent with the obtaining of acceptable improved properties over that now obtainable with polystyrene prepared by casting techniques.

The manner in which our process may be practiced may be varied within wide limits depending upon many factors, for instance, the amount and type of long-chain fatty acid employed, the alkali-metal hydroxide used, the water-to-styrene ratio, the per cent of 1-hydroxycyclohexyl hydroperoxide-1, etc. The following description is a preferred method for effecting the emulsion polymerization, it being understood that we do not intend to be limited in any way by this description:

The styrene, water (de-ionized or distilled) and the alkali-metal hydroxide are heated together for a short time under vacuum at a temperature of about 40 to 50° C. to remove any dissolved gases, such as air, from the materials. The vacuum is then broken by admitting nitrogen gas; thereafter, the long chain fatty acid or mixture of fatty acids, together with any copper or silver salt (if employed) are added. The reaction mixture is then heated to a temperature of about 60° to 70° C. and part of the 1-hydroxycyclohexyl hydroperoxide-1 is added. A vacuum is then applied to the reaction vessel in order to cause the contents to reflux. After about 1 hour of reaction, the second portion of the polymerization catalyst is added, the refluxing continued for another hour and at the end of this time the balance of the catalyst is added to the reaction mass. At the end of an additional 1 to 3 hours of heating at 60° to 70° C., it will be found that the styrene is from 90 to 97 per cent polymerized and the reaction is substantially completed. We have found that the pH of the emulsion (which can be regulated by the amount of alkali-metal hydroxide) at the start of the reaction should preferably be from about 10 to 11 initially, and at the end of the reaction ranges from about 7.5 to 8.0.

The emulsion is then preferably though not essentially steam distilled to remove the unpolymerized styrene (if any) as completely as possible. The emulsion is broken by running it into an approximately equal volume of water containing sufficient acid, for example, hydrochloric acid, to neutralize the alkali-metal hydroxide previously added. The slurry thus formed is boiled until the original fluffy precipitate caused by adding the emulsion to the acid-water solution is converted to a dense sand-like precipitate. The precipitated polystyrene is then isolated by filtration, washed with water, and dried. It is then ready for molding.

In order that those skilled in the art may better understand how the present invention may be practiced, the following examples are given by way of illustration and not by way of limitation. All parts are by weight. Because of the difficulty of obtaining pure myristic acid, it was necessary to use myristic acid containing the additional impurities in the following per cents, by weight, which in no way affected the final results:

| | Per cent |
|---|---|
| Myristic acid | 92.1 |
| Lauric acid | 5.5 |
| Palmitic acid | 2.4 |

Flexural and impact strength tests on the molded product were conducted on a Louis Schopper Dynstat machine.

The heat distortion temperatures of the various samples were measured using a modified A. S. T. M. procedure whereby smaller samples than those required by the regular A. S. T. M. tests were employed. More particularly, instead of using a 5″ x ½″ x ½″ bar, a smaller test specimen ⅝″ x ⅜″ x ⅛″ (dynstat sample) was employed. In addition, a 5-kg. weight was substituted for the standard 2.5-kg. load. With the above exceptions, the procedure was identical with A. S. T. M. test method D648–45T. A comparison of the results of the modified heat distortion test with the standard A. S. T. M. test showed that the results were essentially the same.

*Example I*

In this example varying amounts of myristic acid were employed to show the effect of myristic acid concentration. The following formulations were employed. The per cent, by weight, myristic acid used was based on the weight of the monomeric styrene. The water used in the following samples contained 1 part CuSO₄·5H₂O per million parts of water.

| Sample No. | Weight Styrene | Myristic Acid | Volume 0.432 N KOH | Volume Distilled Water | Weight [1] Catalyst |
|---|---|---|---|---|---|
| | Grams | Per cent | Cc. | Cc. | Grams |
| 1 | 200 | 0.6 | 12.4 | 487.6 | 1.0 |
| 2 | 200 | 0.8 | 16.5 | 483.5 | 1.0 |
| 3 | 200 | 1.0 | 20.3 | 479.7 | 1.0 |
| 4 | 200 | 1.2 | 24.8 | 475.2 | 1.0 |
| 5 | 200 | 1.4 | 28.9 | 471.1 | 1.0 |

[1] 1-hydroxycyclohexyl hydroperoxide-1.

The styrene, water and potassium hydroxide solution were placed in individual pressure vessels, evacuated to remove any trapped air and the vacuum released with nitrogen. The myristic acid and 1-hydroxycyclohexyl hydroperoxide-1 were then added, the bottles closed, and thereafter shaken at 64° C. for 5 hours. The latices were diluted with two volumes distilled water, and coagulated with a 50 per cent excess of hydrochloric acid. The slurry thus obtained was granulated by heating to 80 to 85° C., filtered, and washed several times with hot water, and the granular polystyrene was then dried. Analysis of the yields of the polymer show that they ranged from about 93 to 96 per cent of the theoretical. Samples of each of the dried powders were then molded both by transfer and injection moldings, and heat distortion temperatures, flexural strengths, and impact strengths were determined on the molded samples. Following are the results of these tests:

| Sample No. | Molecular Weight | Transfer Molding | | | Injection Molding | | |
|---|---|---|---|---|---|---|---|
| | | Distortion Temp. | Flexural Strength | Impact Strength | Distortion Temp. | Flexural Strength | Impact Strength |
| | | °C. | | | °C. | | |
| 1 | 185,000 | 99 | 12,300 | 0.06 | 98 | 10,600 | 0.13 |
| 2 | 151,000 | 99 | 11,500 | 0.07 | 96 | 10,500 | 0.11 |
| 3 | 138,000 | 99 | 11,300 | 0.07 | 94 | 9,800 | 0.09 |
| 4 | 131,000 | 92 | 8,000 | 0.04 | 94 | 8,300 | 0.07 |
| 5 | 121,000 | 97 | 9,400 | 0.06 | 92 | 8,400 | 0.06 |

In addition to the results found above which indicate the improved mechanical properties possible by the use of amounts of myristic acid equal to 1 per cent or less, it was found that whereas molded Samples 1, 2 and 3 possessed excellent clarity and were water-white in color, Samples 4 and 5 were hazy in color and in addition showed signs of yellowing and discoloration.

Example II

This example illustrates the advantage obtained by adding the emulsion polymerization catalyst, i. e., 1-hydroxycyclohexyl hydroperoxide-1, in incremental steps. The results should be contrasted with those obtained in Example I in which the catalyst was added all at one time.

| | |
|---|---|
| Styrene grams | 250 |
| 0.425 N KOH solution cc | 14.2 |
| Distilled water cc | 610.8 |
| Myristic acid grams | 1.5 |
| Solution containing 0.06 gram $CuSO_4 \cdot 5H_2O$ per 100 cc. water cc | 1.04 |
| 1-hydroxycyclohexyl hydroperoxide-1 grams | 1.25 |

The styrene, potassium hydroxide, and water were placed in a 3-neck liter flask equipped with a water-sealed stirrer, thermometer well, and stopper and heated to 50° C. The flask was evacuated through a condenser to give a reflux and the vacuum released with nitrogen. The copper sulfate solution was added to the stirred mixture and the temperature brought up to 70° C. at which time the myristic acid and 0.25 gram of the 1-hydroxycyclohexyl hydroperoxide-1 were added to start the reaction. Throughout the reaction the temperature was maintained at around 70° C. After about 60 minutes of reaction an additional 0.50 gram of catalyst was added and about 60 minutes later the remainder of the catalyst was added. At the end of about 137 minutes of total reaction time, it was found that the yield of polystyrene was 94.7 per cent based on theoretical amount. This result is to be contrasted with a yield of 93.1 per cent obtained after five hours of reaction as was required in Example I when the emulsion polymerization catalyst was added all at once.

Example III

This example illustrates the effect of using a long-chain fatty acid whose molecular weight is below the critical 210 average molecular weight required for mixtures of the requisite long-chain acids. More particularly, this example is concerned with the use of lauric acid in concentrations equivalent to the concentrations of the myristic acid found in Example I above.

| | Sample 6 | Sample 7 |
|---|---|---|
| Styrene grams | 250 | 250 |
| 0.425 N KOH solution cubic centimeters | 16.8 | 27.9 |
| Distilled water do | 608.2 | 597.1 |
| Lauric acid grams | 1.5 | 2.5 |
| Water solution containing 0.06 gram $CuSO_4 \cdot 5H_2O$ per 100 cc. water cubic centimeters | 1.04 | 1.04 |
| 1-hydroxycyclohexyl hydroperoxide-1 grams | 1.25 | 1.25 |

The procedures for adding the catalyst and effecting the emulsion polymerization were identical with that employed in Example II. At the end of about five hours of heating at the temperature stipulated in the aforementioned Example II, it was found that the yield of polystyrene in Sample 6 was about 16.8 per cent, and in Sample 7 21.9 per cent of the theoretical.

Example IV

In this example, two runs were made in which the ingredients employed were identical, with the exception that in Sample 8 there was employed 1.5 grams stearic acid and in Sample 9 1.5 grams palmitic acid, each acid corresponding to 0.6 per cent, by weight, of the monomeric styrene employed therein. Otherwise the formulations were as follows:

| | Sample 8 | Sample 9 |
|---|---|---|
| Styrene grams | 250 | 250 |
| 0.425 N KOH solution cubic centimeters | 11.8 | 12.6 |
| Distilled water do | 613.2 | 612.4 |
| Long-chain fatty acid grams | 1.5 | 1.5 |
| Water solution containing 0.06 gram $CuSO_4 \cdot 5H_2O$ per 100 cc. water cubic centimeters | 1.04 | 1.04 |
| 1-hydroxycyclohexyl hydroperoxide-1 grams | 1.25 | 1.25 |

The incremental addition of catalyst and emulsification were carried out in exactly the same manner as employed in Example II. In each case, polymerization was more than 90 per cent complete after 137 minutes. The polystyrene was isolated using the procedure employed in Example I. The isolated polymer was washed with hot water and dried, and samples of each material were injection molded and the molded pieces tested for flexural strength, impact strength, and heat distortion. Each sample had good clarity and exhibited no discoloration. Following are the results of these tests:

| Sample No. | Molecular Weight | Flexural Strength | Impact Strength | Heat Distortion |
|---|---|---|---|---|
| | | | | °C. |
| 8 | 193,000 | 11,100 | 0.15 | 94 |
| 9 | 237,000 | 11,400 | 0.14 | 94 |

Annealing of the molded samples for 64 hours at 85° C. raised the heat distortion temperature of Samples 8 and 9 to 104° C. and 103° C., respectively.

Example V

In this example, mixtures of myristic acid and lauric acid were employed in varying proportions to illustrate the effect of using mixtures of acids whose average molecular weight is above and below an average molecular weight of 210.

| | Sample 10 | Sample 11 | Sample 12 |
|---|---|---|---|
| Styrene_____grams__ | 250 | 250 | 250 |
| 0.425 N KOH solution cubic centimeters_ | 27.1 | 26.7 | 25.9 |
| Distilled water_____do___ | 597.9 | 598.8 | 599.1 |
| Myristic acid_____grams__ | 0.5 | 0.75 | 1.25 |
| Lauric acid_____do____ | 2.0 | 1.75 | 1.25 |
| Solution containing 0.06 gram $CuSO_4 \cdot 5H_2O$ per 100 cc. water cubic centimeters_ | 1.04 | 1.04 | 1.04 |
| 1-hydroxycyclohexyl hydroperoxide-1 grams__ | 1.25 | 1.25 | 1.25 |
| Average molecular weight of myristic and lauric acids_____ | 206 | 210 | 217 |

The incremental addition of the catalyst and the emulsion polymerization of the polymer in each case was identical with that employed in Example II. The isolation of the polymers was accomplished using the technique shown in Example I.

At the end of from 166 to 175 minutes, it was found that polymerization of Samples 11 and 12 had progressed to from 92 to 97 per cent of the theoretical amount. Sample 10 had only polymerized to 60.5 per cent of the theoretical after 239 minutes, thus indicating the marked effect of using average molecular weights of mixtures of the acids having values of and above 210. Mechanical and heat distortion tests conducted on molded pieces from Samples 11 and 12 showed the following results:

| Sample No. | Flexural Strength | Impact Strength | Heat Distortion Temperature |
|---|---|---|---|
| | | | °C. |
| 11 | 10,600 | 0.15 | 95 |
| 12 | 11,200 | 0.14 | 94 |

Example VI

In this example, mixture containing 3 and 4 fatty acids of the requisite type were prepared and employed in the preparation of polystyrene by emulsion polymerization. In each case in the following samples, 250 grams styrene, about 611 cc. distilled water, 1.04 cc. solution containing 0.06 grams $CuSO_4 \cdot 5H_2O$ per 100 cc. water, and 1.25 grams of 1-hydroxycyclohexyl hydroperoxide-1 were employed. In addition, the samples contained the following additional ingredients:

| | Sample 13 | Sample 14 |
|---|---|---|
| 0.425 N KOH solution cubic centimeters__ | 13.98 | 13.40 |
| Lauric acid_____grams__ | 0.357 | 0.274 |
| Myristic acid_____do____ | 0.750 | 0.500 |
| Stearic acid_____do____ | 0.393 | 0.476 |
| Palmitic acid_____do____ | | 0.250 |

The average molecular weight of the blend of the acids in Sample 13 was 240 and in Sample 14 was 250. Each of the samples was prepared in the same manner as employed in Example II. At the end of 197 minutes, Sample 13 showed a yield of about 77 per cent of the theoretical and Sample 14 showed a yield of about 92.8 per cent of the theoretical.

Each of the latices was filtered after cooling and then precipitated as follows: 500 cc. of the latex and 1000 cc. distilled water were stirred together in a 3-liter beaker on a hot plate. Thereafter, 10 cc. of 2 N HCl was slowly added to the stirred mixture and the coagulated polymer vigorously stirred to form a fine slurry. The mixture was then heated to 75—80° C. at which time the polymer granulated. It was then filtered, washed and dried for about 15 hours in a circulating oven at 75° C.

Samples of each of the dried polymer powders were injection molded at about 186–204° C. head temperature and a temperature of 50° C. in the mold. These samples were tested for flexural and impact strengths and heat distortions with the following results:

| Sample No. | Flexural Strength | Impact Strength | Heat distortion |
|---|---|---|---|
| | | | °C. |
| 13 | 11,200 | 0.13 | 97 |
| 14 | 12,200 | 0.15 | 97 |

Each of the samples had excellent clarity, were crystal clear and water-white, and exhibited no evidence of discoloration whatsoever.

Example VII

This example illustrates the effect of using still other mixtures of long-chain fatty acids having an even number of carbon atoms and containing from 12 to 18 carbon atoms whose average molecular weight is equal to from 210 to 284.

| | Example 15 | Example 16 | Example 17 | Example 18 |
|---|---|---|---|---|
| Styrene_____grams__ | 250 | 250 | 250 | 250 |
| Distilled water_____cubic centimeters__ | 609.5 | 610.4 | 13.87 | 13.5 |
| 0.418 N KOH solution_____do____ | 14.5 | 13.6 | 609.1 | 611.3 |
| Aqueous solution containing 0.06 gram $CuSO_4 \cdot 5H_2O$ per 100 cc. water_____cubic centimeters__ | 1.04 | 1.0 | 1.0 | 1.0 |
| Lauric acid_____grams__ | 0.725 | | | 0.75 |
| Myristic acid_____do____ | | 1.0 | 1.0 | |
| Palmitic acid_____do____ | | 0.5 | | 0.75 |
| Stearic acid_____do____ | 0.775 | 0.5 | | |
| 1-hydroxycyclohexyl hydroperoxide-1_____do____ | 1.25 | 1.25 | 1.25 | 1.25 |
| Average molecular weight of acids_____ | 236 | 250 | 242 | 246 |

In each case the styrene, water, copper sulfate, and potassium hydroxide solutions were mixed together and heated to 50° C., evacuated to give a reflux and the vacuum released with nitrogen. At the end of this time 0.25 gram of each mixture of the fatty acids was added and the mixture heated with stirring to 70° C. At the end of one hour an additional 0.50 gram of the respective catalyst mixture was added and after an additional 60 minutes of heating at about 20° C. the remainder of the catalyst was added. At the end of the following times the indicated per cent yields were obtained based on the theoretical:

| Sample No. | Reaction Time in Minutes | Per Cent Yield |
|---|---|---|
| 15 | 219 | 92.5 |
| 16 | 198 | 90.6 |
| 17 | 146 | 94.2 |
| 18 | 141 | 87.5 |

Transfer molded samples of each of the isolated products prepared above were tested for flexural strengths and heat distortion temperatures with the following results:

| Sample No. | Flexural Strength | Heat Distortion Temperature |
|---|---|---|
| | | °C. |
| 15 | [1] 11,700 | 94 |
| 16 | 9,400 | 100 |
| 17 | 9,000 | 96 |
| 18 | 10,400 | 96 |

[1] Injection molded.

The various molded samples had excellent color and clarity comparable to that obtained using myristic acid alone.

In the practice of our invention, as stated previously, we have found it desirable to employ water-soluble silver and copper inorganic salts. The use of these salts is not absolutely essential in obtaining polystyrene having the desirable properties discussed previously. However, we have found that the presence of these silver and copper salts increases the rate of polymerization so that lower temperatures and shorter periods of time are required for effecting the polymerization of the styrene to yield the desired products.

We have found that good results are obtained using concentrations of the copper and silver salts in the range of from about 0.25 to 5 parts of the salt per million parts of water. The preferable range is around 0.5 to 2.0 parts of the salt per million parts of water. The use of larger than 5 parts per million gave a slow rate and incomplete polymerization. Using, for example, from 0.5 to 2.0 parts CuSO$_4$·5H$_2$O per million parts of water, we have obtained polystyrene having flexural strengths ranging from 10,800 to 14,000 p. s. i. and heat distortion temperatures of around 97° C. For more complete details of the effect of using copper sulfate, attention is directed to many of the foregoing examples.

In the following example are found test results establishing the advantage of using a certain ratio of monomeric styrene to water in the emulsified system.

*Example VIII*

| Sample No. | Weight Styrene | Weight Myristic acid | Volume 0.412 N KOH | Volume Distilled Water | Water-Monomer Ratio | Weight Catalyst[1] |
|---|---|---|---|---|---|---|
| | Grams | Grams | Cc. | Cc. | | Grams |
| 19 | 200 | 1.2 | 12.3 | 587.5 | 3.0:1 | 1.0 |
| 20 | 200 | 1.2 | 12.3 | 487.7 | 2.5:1 | 1.0 |
| 21 | 200 | 1.2 | 12.3 | 427.7 | 2.2:1 | 1.0 |
| 22 | 200 | 1.2 | 12.3 | 347.7 | 1.8:1 | 1.0 |
| 23 | 200 | 1.2 | 12.3 | 287.7 | 1.5:1 | 1.0 |
| 24 | 200 | 1.2 | 12.3 | 187.7 | 1.0:1 | 1.0 |

[1] 1-hydroxycyclohexyl hydroperoxide-1.

The styrene, water, and KOH solution were placed in pressure reactors and evacuated to free the mass from dissolved gases. The vacuum was released with nitrogen and the myristic acid and 1-hydroxycyclohexyl hydroperoxide-1 were added. The reactors were closed and heated with shaking at 70° C. for four hours. Following are the percentage yields obtained in each case:

| Sample No. | Per Cent Yield |
|---|---|
| 19 | Very low |
| 20 | 93.6 |
| 21 | 94.8 |
| 22 | 95.5 |
| 23 | 95.2 |
| 24 | 97.0 |

The latices were diluted with water and precipitated with a 50 per cent excess HCl. Each slurry was granulated by heating, and thereafter filtered and washed with hot water. Molded samples were prepared by injection molding from each of the precipitated polymers. These molded samples were tested for heat distortion temperatures, flexural strengths, and impact strengths. Because of the low yield, no samples were molded from run 19. Following are the results of the tests:

| Sample No. | Heat Distortion Temperature | Flexural Strength | Impact Strength |
|---|---|---|---|
| | °C. | P. s. i. | |
| 20 | 95 | 13,800 | 0.13 |
| 21 | 95 | 13,000 | 0.12 |
| 22 | 94 | 13,000 | 0.12 |
| 23 | 95 | 12,300 | 0.10 |
| 24 | 95 | 12,800 | 0.11 |

In each case the molded samples had excellent clarity and were free of color. However, the use of less than a 2.5:1 water-monomer ratio increased the viscosity of the emulsified mixture to an undesirable extent and made stirring and heat removal therefrom difficult.

*Example IX*

This example embraces the preparation of polystyrene on a pilot plant scale employing our claimed emulsion polymerization process. The polystyrene obtained in this case was molded and tested using standard ASTM mechanical strength and heat distortion tests. For comparison, tests were also conducted on two types of polystyrene available commercially from two different sources and which are produced by casting methods.

| | Weight |
|---|---|
| Styrene | lbs__ 47.3 |
| Deionized water | lbs__ 114.4 |
| Myristic acid | grams__ 126.3 |
| CuSO₄·5H₂O (in a small amount of water) | grams__ 0.052 |
| 3.541 N potassium hydroxide (95% based on myristic acid) | grams__ 143.3 |
| 1 - hydroxycyclohexyl hydroperoxide - 1 | grams__ 109.0 |

All the ingredients except the catalyst and myristic acid were placed in a 25 gallon glass-lined kettle equipped with a stirrer and which was jacketed by suitable heating means. The kettle was then heated to about 50° C., closed and a 24 inch vacuum applied for 4 to 5 minutes to the system through a condenser attached to the kettle. The vacuum was released with nitrogen and the kettle opened. When the temperature reached about 55° C., the myristic acid and 21.8 grams of the catalyst were added, the kettle sealed, and brought to a controlled vacuum of 18 to 19 inches which maintained a fairly constant reflux temperature of the mass at around 61° to 65° C. throughout the reaction. After one hour, the vacuum was released, and 43.6 grams of catalyst were added and the mass again heated under vacuum at the aforementioned temperature. At the end of 2 hours, the vacuum was again broken and the final amount of catalyst (43.6 grams) was added, the kettle closed and again heated under vacuum for an additional hour. At the end of this time (3 hours' total reaction time), the vacuum was released and about 3.2 per cent unpolymerized styrene was removed by stripping.

The latex was then added slowly to an amount of water containing a 25 per cent excess of hydrochloric acid and heated to coagulate the polystyrene slurry to a sand-like product. The polymer (obtained in about a 96 per cent yield) was filtered, washed with boiling water, and dried at about 120° C., and densified by passing the same through calender rolls to give a clear, densified sheet. The sheet was broken into sections and ground to give a suitable molding composition. This molding compound (identified as Sample No. 25) and two commercially available polystyrenes produced by casting (identified by Samples 26 and 27, respectively) were injection molded in an injection press wherein the head-temperature was around 250° C. The samples were molded in the form of test specimens whose dimensions and shape were the same as those required for conducting standard ASTM tests. In each case, crystal-clear, water-white, molded objects were obtained which were free of discoloration. Following are the results of these tests on the three samples:

| Test | Sample 25 | Sample 26 | Sample 27 |
|---|---|---|---|
| Impact Charpy Unnotched ft. lbs__ | ¹ 2+ | 1.35 | 1.88 |
| Impact Izod Unnotched ft. lbs__ | 1.83 | 0.97 | 1.24 |
| Flexural Strength__p. s. i__ | 12,900 | 10,100 | 10,300 |
| Tensile Strength__p. s. i__ | 7,516 | 6,260 | 6,320 |
| Heat Distortion__°C__ | 91 | 80 | 78 |

¹ Reading was in excess of 2 ft. lbs.

It will, of course, be apparent to those skilled in the art that other modifying ingredients, for example, saturated aliphatic mercaptans, for instance, dodecyl mercaptan, etc., which cause certain desirable improvements in the final polymerized styrene may also be added during the polymerization operation without departing from the scope of our invention. Thus, we have found it advantageous to add from 0.05 to 0.5 per cent, by weight, based on the weight of the styrene of dodecyl mercaptan in order to obtain a polystyrene having improved plasticity characteristics. The addition of this material in no way retards the course of the polymerization and does not change the properties of the polymers undesirably.

Polystyrene prepared in accordance with our claimed process is particularly amenable to injection and transfer molding due to its outstanding plasticity and fluidity under molding conditions. Even though the properties of the molded products are superior to polystyrene prepared by the casting method, nevertheless, it is not necessary to employ any unusual molding conditions to obtain these properties since injection molding apparatus and conditions commonly employed are satisfactory.

The molded products obtained from the polystyrene prepared in accordance with the disclosures and teachings stated above have eminent use as dielectric materials, for example, as spacers for coaxial cables, as insulating materials for electrical conductors, etc. Because of its outstanding heat distortion properties and mechanical strengths, polystyrene prepared in accordance with our process finds extensive use for decorative electrical light fixtures.

The polystyrene prepared in accordance with our process may be also modified with various ingredients, for example, dyes, pigments, or other modifying resins both natural and synthetic. Because of the fact that the polystyrene is obtained as a finely dispersed suspension, it can readily be dyed or pigmented by merely adding the latter to the water emulsion and mixing the composition thoroughly.

What we claim as new and desire to secure by Letters Patent of the United States is:

1. The method of producing a crystal-clear polystyrene free of dicoloration and having a heat distortion temperature of at least 90° C., which method comprises heating an emulsified mass comprising (1) styrene, (2) water, (3) an alkali-metal hydroxide sufficient to neutralize at least 85 per cent of the fatty acid component of (4), (4) a fatty acid component selected from the class consisting of (a) myristic acid, (b) palmitic acid, (c) stearic acid, and (d) mixtures of saturated aliphatic monocarboxylic acids having an even number of carbon atoms and containing from 12 to 18 carbon atoms whose average molecular weight is equal to from at least 210 to less than 284, said fatty acid component being present in an amount equal to from 0.3 per cent up to and including 1 per cent, by weight, based on the weight of the styrene, and (5) a polymerization catalyst comprising 1-hydroxycyclohexyl hydroperoxide-1.

2. The method of producing a crystal-clear polystyrene free of discoloration and having a heat distortion temperature of at least 90° C., which method comprises heating an emulsified mass comprising (1) styrene, (2) water, and (3)

from 0.3 to 1 per cent, by weight, myristic acid based on the weight of (1), (4) an alkali-metal hydroxide sufficient to neutralize at least 85 per cent of the myristic acid, and (5) a polymerization catalyst comprising 1-hydroxycyclohexyl hydroperoxide-1.

3. The method of producing a crystal-clear polystyrene free of discoloration and having a heat distortion temperature of at least 90° C., which method comprises heating an emulsified mass comprising (1) styrene, (2) water, and (3) from 0.3 to 1 per cent, by weight, palmitic acid based on the weight of (1), (4) an alkali-metal hydroxide sufficient to neutralize at least 85 per cent of the palmitic acid, and (5) a polymerization catalyst comprising 1-hydroxycyclohexyl hydroperoxide-1.

4. The method of producing a crystal-clear polystyrene free of discoloration and having a heat distortion temperature of at least 90° C., which method comprises heating an emulsified mass comprising (1) styrene, (2) water, (3) from 0.3 to 1 per cent, by weight, based on the weight of (1) of a mixture of saturated aliphatic monocarboxylic acids having an even number of carbon atoms and containing from 12 to 18 carbon atoms whose average molecular weight is equal to from at least 210 to less than 284, (4) an alkali-metal hydroxide sufficient to neutralize at least 85 per cent of the acids of (3), and (5) a polymerization catalyst comprising 1-hydroxycyclohexyl hydroperoxide-1.

5. The method of producing a crystal-clear polystyrene free of discoloration and having a heat distortion temperature of at least 90° C., which method comprises heating an emulsified mass comprising (1) styrene, (2) water, (3) from 0.3 to 1 per cent, by weight, based on the weight of (1), of a fatty acid component selected from the class consisting of (a) myristic acid, (b) palmitic acid, (c) stearic acid, and (d) mixtures of saturated aliphatic monocarboxylic acids having an even number of carbon atoms and containing from 12 to 18 carbon atoms whose average molecular weight is equal to from at least 210 to less than 284, (4) an alkali-metal hydroxide sufficient to neutralize at least 85 per cent of the acids of (3), (5) a polymerization catalyst comprising 1 - hydroxycyclohexyl hydroperoxide-1, and (6) a salt selected from the class consisting of water-soluble, inorganic copper salts and water-soluble inorganic silver salts.

6. The method as in claim 5 wherein the water-soluble salt of (6) is copper sulfate.

7. The method of producing a crystal-clear polystyrene free of discoloration and having a heat distortion temperature of at least 90° C., which method comprises heating at a temperature of from 50 to 90° C. an emulsified mass comprising (1) styrene, (2) water, the water being present, by weight, in an amount equal to from 1.5 to 2.8 parts water per part styrene, (3) from 0.3 to 1 per cent, by weight, based on the weight of (1), of a fatty acid component selected from the class consisting of (a) myristic acid, (b) palmitic acid, (c) stearic acid, and (d) mixtures of saturated aliphatic monocarboxylic acids having an even number of carbon atoms and containing from 12 to 18 carbon atoms whose average molecular weight is equal to from at least 210 to less than 284, (4) potassium hydroxide sufficient to neutralize at least 85 per cent of the acids of (3), and (5) a polymerization catalyst comprising 1-hydroxycyclohexyl hydroperoxide-1.

8. The method of producing a crystal-clear polystyrene free of discoloration and having a heat distortion temperature of at least 90° C., which method comprises heating at a temperature of from 50° to 90° C., an emulsified mass comprising (1) styrene, (2) water, the water being present, by weight, in an amount equal to from 1.5 to 2.8 parts water per part styrene, (3) from 0.3 to 1 per cent, by weight, based on the weight of (1) of myristic acid, (4) potassium hydroxide sufficient to neutralize at least 90 per cent of the myristic acid of (3), and (5) a polymerization catalyst consisting of 1-hydroxycyclohexyl hydroperoxide-1.

9. The method of producing a crystal-clear polystyrene free of discoloration and having a heat distortion temperature of at least 90° C., which method comprises heating an emulsified mass comprising (1) styrene, (2) water, (3) potassium hydroxide sufficient to neutralize at least 85 per cent of the fatty acid component of (4), (4) a fatty acid component selected from the class consisting of (a) myristic acid, (b) palmitic acid, (c) stearic acid, and (d) mixtures of saturated aliphatic monocarboxylic acids having an even number of carbon atoms and containing from 12 to 18 carbon atoms whose average molecular weight is equal to from at least 210 to less than 284, said fatty acid component being present in an amount equal to from 0.3 per cent up to and including 1 per cent, by weight, based on the weight of the styrene, and (5) a polymerization catalyst consisting of 1-hydroxycyclohexyl hydroperoxide-1.

10. The method of producing crystal-clear polystyrene free of discoloration whose heat distortion temperature is at least 90° C., which method comprises heating at a temperature of from 60 to 75° C. an emulsified mass comprising (1) styrene, (2) water, the water being present, by weight, in an amount equal to from 1.5 to 2.8 parts water per part styrene, (3) from 0.4 to 0.8 per cent, by weight, myristic acid based on the weight of styrene, (4) potassium hydroxide sufficient to neutralize at least 95 per cent of the myristic acid, (5) from 0.25 to 1 per cent, by weight, based on the weight of the styrene, of a polymerization catalyst consisting of 1-hydroxycyclohexyl hydroperoxide-1, and (6) copper sulfate, the copper sulfate being present in an amount equal to from 0.25 to 3 parts per million parts of water.

11. The method as in claim 10 wherein the 1-hydroxycyclohexyl hydroperoxide-1 is added incrementally as follows:

From 15 to 25 per cent at the start of the emulsion polymerization;
From 35 to 50 per cent after approximately one hour of reaction;
The remainder of the catalyst after about two hours of reaction.

12. The method of preparing a polystyrene which on molding is crystal-clear, free of discoloration and has a heat distortion temperature of at least 90° C., which method comprises heating at a temperature ranging from 50 to 90° C. an emulsified mass comprising (1) styrene, (2) water; (3) from 0.3 to 1 per cent, by weight, based on the weight of (1) of a mixture of lauric acid, myristic acid, and stearic acid, wherein the average molecular weight of the acids is equal to at least 210 and less than 284, (4) potassium hydroxide sufficient to neutralize at least 95 per cent of the mixture of acids in (3), (5) from 0.25 to 1 per cent, by weight, based on the weight of the styrene, of 1-hydroxycyclohexyl hydroperoxide-1, and (6) $CuSO_4 \cdot 5H_2O$ wherein the latter is present in an amount equal to from 0.25 to 3 parts per million parts of water.

EDMOND F. FIEDLER.
GLENNARD R. LUCAS.

REFERENCES CITED

The following references are of record in the file of this patent:

Brajnikoff: Plastics (London), July 1942, (pages 230–238).

Hohenstein et al.: India Rubber World, vol. 111, pp. 173–177, Nov. 1944.